United States Patent
Hotani et al.

(10) Patent No.: US 9,346,208 B2
(45) Date of Patent: May 24, 2016

(54) MIXING/EXTRUDING APPARATUS AND START-UP METHOD FOR MIXING/EXTRUDING APPARATUS

(75) Inventors: Shin Hotani, Takasago (JP); Tatsuto Nagaoka, Takasago (JP); Takeshi Hatanaka, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 947 days.

(21) Appl. No.: 13/526,879

(22) Filed: Jun. 19, 2012

(65) Prior Publication Data

US 2013/0016580 A1 Jan. 17, 2013

(30) Foreign Application Priority Data

Jul. 12, 2011 (JP) .................. 2011-153843

(51) Int. Cl.
*B29C 47/10* (2006.01)
*B29C 47/00* (2006.01)
*B29B 7/42* (2006.01)
(Continued)

(52) U.S. Cl.
CPC ............... *B29C 47/0011* (2013.01); *B29B 7/42* (2013.01); *B29B 9/065* (2013.01); *B29C 47/0066* (2013.01); *B29C 47/0801* (2013.01); *B29C 47/38* (2013.01); *B29C 47/92* (2013.01); *B29C 2947/9259* (2013.01); *B29C 2947/92542* (2013.01)

(58) Field of Classification Search
CPC ............................. B28C 5/0837; B29C 47/92
USPC .................................. 366/79, 100, 76.2, 601
See application file for complete search history.

(56) References Cited

U.S. PATENT DOCUMENTS 4,737,092 A * 4/1988 Bullick .................. A21C 11/16
425/142
5,219,588 A * 6/1993 England ................ B29C 47/003
264/177.1
(Continued)

FOREIGN PATENT DOCUMENTS

DE 10 2005 007 102 A1 8/2006
EP 2 138 296 A1 12/2009
(Continued)

OTHER PUBLICATIONS

"Medium Voltage IGBT Inverter for Soft Starter System", TMdrive-MV, Toshiba Mitsubishi-Electric Industrial Systems Corporation, Oct. 2005, pp. 1-10.

*Primary Examiner* — Tony G Soohoo
*Assistant Examiner* — Anshu Bhatia
(74) *Attorney, Agent, or Firm* — Oblon, McClelland, Maier & Neustadt, L.L.P

(57) ABSTRACT

A mixing/extruding apparatus having a mixer/extruder provided with a diverter, an electric motor for driving this mixer/extruder, and a power supply device for supplying a drive power to this electric motor, and the power supply device includes a start-up power supply portion for supplying a drive power with which the electric motor is rotated at low speed with a smaller output than an output generated upon the normal operation to the electric motor, an operation power supply portion for supplying a drive power with which the electric motor is rotated at high speed with the output generated upon the normal operation to the electric motor, and a power supply switching device for switching the drive power from the start-up power supply portion to be supplied to the electric motor to the drive power from the operation power supply portion.

3 Claims, 3 Drawing Sheets

(51) Int. Cl.
  *B29B 9/06* (2006.01)
  *B29C 47/08* (2006.01)
  *B29C 47/92* (2006.01)
  *B29C 47/38* (2006.01)

(56) References Cited

U.S. PATENT DOCUMENTS

| | | |
|---|---|---|
| 6,589,040 B1 | 7/2003 | Cousin |
| 2009/0115091 A1 | 5/2009 | Eloo et al. |
| 2010/0046318 A1* | 2/2010 | Holt ................. A21C 11/10 366/76.2 |
| 2011/0121477 A1 | 5/2011 | Qiu et al. |
| 2012/0267818 A1 | 10/2012 | Eloo et al. |
| 2013/0224321 A1 | 8/2013 | Eloo et al. |

FOREIGN PATENT DOCUMENTS

| | | |
|---|---|---|
| JP | 2002-522253 | 7/2002 |
| JP | 2007-181949 | 7/2007 |
| JP | 2008-30442 | 2/2008 |
| JP | 2009-51032 | 3/2009 |
| JP | 2009-220333 | 10/2009 |
| JP | 2009-220486 | 10/2009 |

* cited by examiner

MIXING/EXTRUDING APPARATUS AND START-UP METHOD FOR MIXING/EXTRUDING APPARATUS

BACKGROUND OF THE INVENTION

1. Field of the Invention

The present invention relates to a mixing/extruding apparatus, and a start-up method for a mixing/extruding apparatus.

2. Description of the Related Art

A mixer/extruder used for manufacturing resin pellets has a charging portion for resin, a mixing portion for feeding the charged resin while mixing the resin with a rotor, a screw, and the like, and an extruding portion for extruding the melt resin mixed into a melt state. A pelletizer such as an underwater cutting pelletizing device is coupled to an outlet part (on the downstream side) of the extruding portion, so that pelletizing to the pellets is performed with this pelletizer.

In such a mixer/extruder, by providing an electric motor for rotating and driving the rotor, the screw, and the like of the mixing portion, and a power supply device for supplying a drive power to this electric motor, a mixing/extruding apparatus is formed. As the electric motor, an electric motor having an optimum output is selected from outputs exceeding a few thousand kW to ten thousand kW in accordance with a type or a processing amount of the resin to be mixed.

Upon start-up of the mixing/extruding apparatus, the electric motor is started up, a small amount of the resin is next charged from the charging portion of the mixer/extruder, and then, the melt resin is taken out from an opening portion (diverter) provided on the near side of an outlet of the extruding portion to an exterior of the mixer/extruder, or the extruding portion and the pelletizer are separated, so that the melt resin is taken out from a die plate provided in the outlet of the extruding portion to the exterior of the mixer/extruder. After the melt state of the taken resin is confirmed, the diverter is closed and the pelletizer is coupled to the extruding portion, so that the mixing/extruding apparatus shifts to a continuous normal operation (for example, refer to Japanese Examined Patent Application Publication Nos. 2009-220486 and 2009-220333).

In recent years, since an increase in the processing amount is required, a large-sized mixer/extruder with a mixing chamber having a large inner diameter (diameter) is increasingly used. In this mixer/extruder, when a flow rate of the resin to be charged upon start-up is small, a retaining time of the resin is increased. Further, the resin is rotated at fixed high speed which is the same as the normal operation in the mixing chamber, so that shear force is applied to the resin by the number of times which is excessive with respect to a small charging amount of the resin.

Due to these factors, a temperature of the resin is increased more than necessary. If the mixing/extruding apparatus shifts to the normal operation while the resin is in such a state, a quality problem is caused in the melt resin in an actual normal operation or there is a problem that difficulty is created in a cutting operation of the pelletizer.

For such a reason, it is preferable to bring the flow rate of the resin to be charged upon the start-up as close to the normal operation as possible (to increase the flow rate). On the other hand, in a case where the resin taken out from the mixer/extruder is treated by a manual work, it is unfavorable to increase the flow rate with no reason. Thus, after the melt state of the resin taken out from the mixer/extruder is confirmed, in order to eliminate a need for the manual work in a case where the flow rate is large, there is a proposed method for conveying a large amount of the discharged resin to outdoors of a plant building or the like by a conveying device (for example, refer to Japanese Examined Patent Application Publication Nos. 2002-522253 and 2007-181949).

It should be noted that as one measure for avoiding the problems upon the start-up in the mixer/extruder as described above, there is a proposed method in which a small-sized electric motor for start-up is provided separately from an electric motor, this small-sized electric motor for the start-up is used for rotation and driving at low speed at the time of starting up a mixing/extruding apparatus, and the small-sized electric motor is switched to the electric motor when the mixing/extruding apparatus shifts to a normal operation, so that fixed-speed rotation and driving are performed at high speed by this electric motor (for example, refer to Japanese Examined Patent Application Publication Nos. 2008-30442 and 2009-51032).

In the method for conveying the resin taken out from the mixer/extruder to the outdoors of the plant building or the like by the conveying device disclosed in Japanese Examined Patent Application Publication Nos. 2002-522253 and 2007-181949, although a charging resin amount upon the start-up can be increased, an amount of the resin to be taken out is also large. Thus, there is a problem that a harmful influence on an environment is increased.

In the method in which the small-sized electric motor for the start-up is provided separately from the electric motor disclosed in Japanese Examined Patent Application Publication Nos. 2008-30442 and 2009-51032, a device configuration is enlarged and complicated due to the two electric motors. Thus, there is a problem that not only equipment cost but also manufacturing cost of pellets are eventually increased.

SUMMARY OF THE INVENTION

The present invention is developed in consideration with the above situation, and an object thereof is to provide a mixing/extruding apparatus and a start-up method for a mixing/extruding apparatus capable of suppressing a resin take-out amount from a mixer/extruder upon start-up of the mixing/extruding apparatus, preventing deterioration of resin quality and a problem in a cutting operation in a case where the mixing/extruding apparatus shifts to a normal operation, and further preventing enlargement and complication of a device configuration.

In order to achieve the above object, the present invention has the following means.

That is, a mixing/extruding apparatus according to the present invention has a mixer/extruder provided with a diverter, an electric motor for driving the mixer/extruder, and a power supply device for supplying a drive power to the electric motor, wherein the power supply device includes a start-up power supply portion for supplying a drive power with which the electric motor is rotated at low speed with a smaller output than an output generated upon a normal operation to the electric motor, an operation power supply portion for supplying a drive power with which the electric motor is rotated at high speed with the output generated upon the normal operation to the electric motor, and a power supply switching device for switching the drive power from the start-up power supply portion to be supplied to the electric motor to the drive power from the operation power supply portion.

Preferably, the start-up power supply portion may be a power supply for supplying a drive power with which a maximum output of the electric motor becomes 60% or less of a rated output to the electric motor.

Preferably, the power supply may include a transformer, and a variable-voltage and variable-frequency power supply device.

A start-up method for a mixing/extruding apparatus according to the present invention includes the steps of opening a diverter provided in a mixer/extruder, charging a smaller flow rate of resin than a normal operation to the mixer/extruder, rotating an electric motor for driving the mixer/extruder at low speed with an smaller output than an output generated upon the normal operation by a drive power from a start-up power supply portion, increasing the flow rate of the resin while the electric motor is driven by the drive power from the start-up power supply portion, switching the drive power to a drive power from an operation power supply portion when a load exceeding a maximum output of the electric motor by the drive power from the start-up power supply portion is generated in the electric motor due to an increase in the flow rate of the resin, so as to rotate the electric motor at high speed with the output generated upon the normal operation, and closing the diverter so as to shift to the normal operation.

Preferably, a drive power with which the maximum output of the electric motor becomes 60% or less of a rated output may be supplied from the start-up power supply portion to the electric motor.

Preferably, upon start-up of the mixer/extruder, the rotation number of the electric motor may be increased to the rotating speed upon the normal operation by the start-up power supply portion, and subsequently, the drive power to be supplied to the electric motor may be switched to the drive power from the operation power supply portion.

The mixing/extruding apparatus and the start-up method for the mixing/extruding apparatus according to the present invention are capable of suppressing the resin take-out amount from the mixer/extruder upon the start-up of the mixing/extruding apparatus, preventing the deterioration of the resin quality and the problem in the cutting operation in a case where the mixing/extruding apparatus shifts to the normal operation, and further preventing the enlargement and the complication of the device configuration.

DESCRIPTION OF THE PREFERRED EMBODIMENTS

Hereinafter, embodiments of the present invention will be described based on the drawings.

First Embodiment

Figure 1:
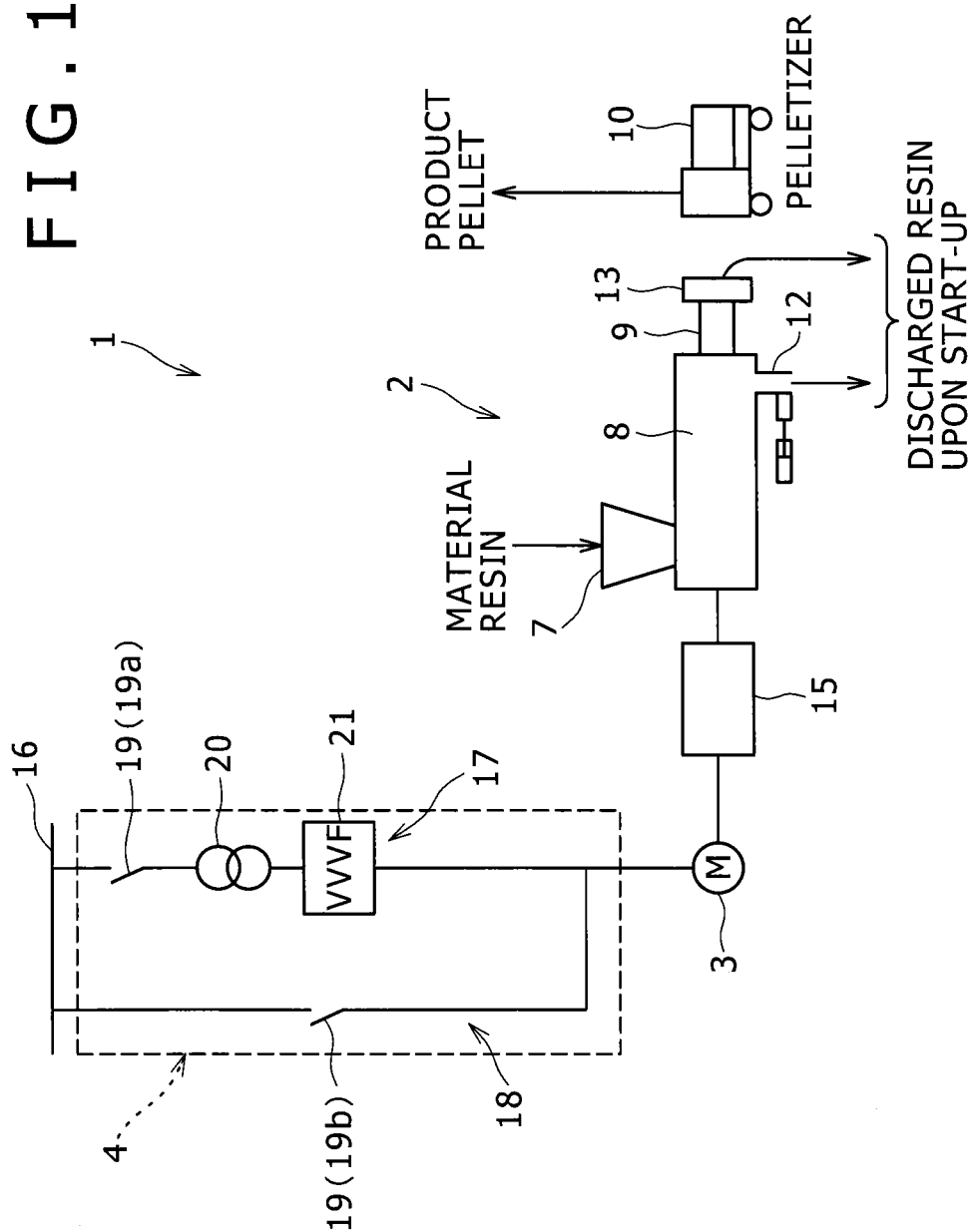
FIG. 1 is a side view schematically showing a first embodiment of a mixing/extruding apparatus according to the present invention.

FIG. 1 shows a first embodiment of a mixing/extruding apparatus according to the present invention.

This mixing/extruding apparatus 1 has a mixer/extruder 2 for mixing and extruding resin, an electric motor 3 (main electric motor) for driving this mixer/extruder 2, and a power supply device 4 for supplying a drive power to this electric motor 3.

The mixer/extruder 2 has a charging portion 7 for resin, and a rotor, a screw, and the like provided with a mixing portion 8 for mixing the charged resin and a conveying portion for feeding the resin mixed into a melt state to the downstream. In the present embodiment, a pelletizer 10 such as an underwater cutting pelletizing device is coupled to an outlet part (on the downstream side) of this mixer/extruder 2, so that pelletizing to pellets is performed with this pelletizer 10.

A diverter 12 (opening portion) is provided on the near side of an outlet of the mixer/extruder 2. When this diverter 12 is opened, the resin mixed and melt in the mixing portion 8 can be taken out to an exterior of the mixer/extruder 2. When the mixer/extruder 2 and the pelletizer 10 are separated, the melt resin can be taken out from a die plate 13 provided in a front end of the mixer/extruder 2 via an attachment portion 9 to the exterior of the mixer/extruder 2.

A reducer 15 is provided in a coupling part between the mixer/extruder 2 and the electric motor 3. Drive rotation of the electric motor 3 is reduced by this reducer 15 and then transmitted to the rotor, the screw, and the like in the mixer/extruder 2.

An induction motor or a synchronous motor rotated and driven at fixed speed is used as the electric motor 3. As this electric motor 3, an electric motor having an optimum output is selected from outputs exceeding a few thousand kW to ten thousand kW in accordance with a type or a processing amount of the resin to be mixed.

The power supply device 4 has a start-up power supply portion 17 specified to supply a power required upon start-up of the mixing/extruding apparatus 1 to the electric motor 3 based on a power from a three-phase AC power supply 16, an operation power supply portion 18 specified to supply a power required upon a normal operation of the mixing/extruding apparatus 1 to the electric motor 3 based on the power from the three-phase AC power supply 16, and a power supply switching device 19 for switching power supply to the electric motor 3 between the start-up power supply portion 17 and the operation power supply portion 18.

The start-up power supply portion 17 is to rotate the electric motor 3 at low speed with a smaller output than an output generated upon the normal operation of the mixing/extruding apparatus 1. For example, in a case where a rated output of the electric motor 3 is 10,000 kW, the start-up power supply portion 17 for supplying a power with which 60% or less of the rated output is a maximum output to the electric motor 3 may be adopted.

In the present embodiment, the start-up power supply portion 17 has a transformer 20 for making the output smaller than the output generated upon the normal operation, and a variable-voltage and variable-frequency power supply device (VVVF) 21 for enabling rotation speed control of the electric motor 3. The variable-voltage and variable-frequency power supply device 21 having a capacity of 6,000 kW corresponding to 60% of the output of the electric motor 3 is adopted.

A reason for setting the maximum output of the start-up power supply portion 17 to 60% or less is as follows.

That is, upon the start-up of the mixing/extruding apparatus 1, a flow rate of the resin to be charged to the charging portion 7 of the mixer/extruder 2 is desirably as small as possible in consideration with workability of a resin take-out work. At most, the flow rate should be a half or less of a maximum flow rate of the resin to be charged to the charging portion 7 of the mixer/extruder 2 upon the normal operation. In accordance with reduction of the flow rate of the resin to be charged to the mixer/extruder 2 to a half or less, rotation speed of the rotor or the screw can be low speed in the mixing portion 8 of the mixer/extruder 2. The present inventors found that at this time, when a consumed power of the electric motor 3 is calculated based on torque required in the mixing portion 8, the power may be 60% or less of the rated output of the electric motor 3.

Meanwhile, the operation power supply portion 18 is to rotate the electric motor 3 at high speed with the output fit for the normal operation of the mixing/extruding apparatus 1. As a matter of course, in a case where the rated output of the electric motor 3 is 10,000 kW, there is a need for adopting the operation power supply portion 18 of an output with which the electric motor 3 can be driven by a maximum ability thereof (100% of the rated output of the electric motor 3). Therefore, the operation power supply portion 18 may form a direct circuit (bypass) for enabling this output of the three-phase AC power supply 16 to be directly supplied to the electric motor 3.

The power supply switching device 19 is to switch a power supply state to the electric motor 3 between the start-up power supply portion 17 and the operation power supply portion 18 as described above. In the present embodiment, the power supply switching device has a start-up side switching portion 19a including a switch for connecting or cutting a circuit of the start-up power supply portion 17, and an operation side switching portion 19b including a switch for connecting or cutting the circuit of the operation power supply portion 18.

Next, based on a use mode of the mixing/extruding apparatus 1 according to the present invention, a start-up method for a mixing/extruding apparatus according to the present invention will be described.

Firstly, the diverter 12 of the mixer/extruder 2 is opened, and the pelletizer 10 is separated from the mixer/extruder 2, so that the die plate 13 attached to the attachment portion 9 is brought into an open state (state that the die plate is exposed to the exterior). In the power supply switching device 19 of the power supply device 4, by turning the start-up side switching portion 19a "ON", and turning the operation side switching portion 19b "OFF", the start-up power supply portion 17 is selected. The power from this start-up power supply portion 17 is supplied so as to start up the electric motor 3, and the rotor or the screw of the mixing portion 8 in the mixer/extruder 2 is rotated and driven by this electric motor 3.

At this time, by controlling the variable-voltage and variable-frequency power supply device 21 in the start-up power supply portion 17, rotation speed of the electric motor 3 is set to be low-speed rotation of about 50% to 80% of rotation speed upon the normal operation of the mixing/extruding apparatus 1 (maximum rotation speed). As a matter of course, by this control of the start-up power supply portion 17, the rotation speed of the rotor or the screw of the mixing portion 8 in the mixer/extruder 2 also becomes low-speed rotation.

Next, a material resin supplier (not shown) is started up, and the material resin is charged to the mixer/extruder 2 from the charging portion 7. At this time, the charging flow rate of the resin is preferably about 10% to 40% of a maximum flow rate of the resin to be charged to the charging portion 7 of the mixer/extruder 2 in consideration with the workability of the resin take-out work.

In such a way, the mixed and melt resin is brought into a state that the resin can be taken out from the diverter 12 of the mixer/extruder 2 and the die plate 13, and the melt state of the taken resin is confirmed. In a case where a melt temperature of the taken resin is too high, the variable-voltage and variable-frequency power supply device 21 in the start-up power supply portion 17 is controlled, so as to further lower the rotation speed of the electric motor 3. Thereby, the rotation speed of the rotor or the screw of the mixer/extruder 2 is also reduced, so that the temperature of the resin is lowered.

In such a start-up operation of the mixing/extruding apparatus 1 using the start-up power supply portion 17, the resin flow rate in the mixing portion of the mixer/extruder 2 is small. Thus, a load applied to the electric motor 3 is 60% or less of the rated output, that is, 6,000 kW or less.

When the melt state of the resin taken out from the diverter 12 of the mixer/extruder 2 or the die plate 13 becomes proper, the die plate 13 is coupled to the pelletizer 10 while maintaining a state that the resin is taken out from the side of the diverter 12.

While pellet cooling water is supplied into the pelletizer 10, a cutter (not shown) is rotated in this pelletizer 10, and this cutter is brought into contact with the die plate 13 of the mixer/extruder 2. At this time, by closing the diverter 12, the mixing/extruding apparatus shifts to the normal operation. In such a way, pellet manufacture is started in the pelletizer 10.

Figure 2:
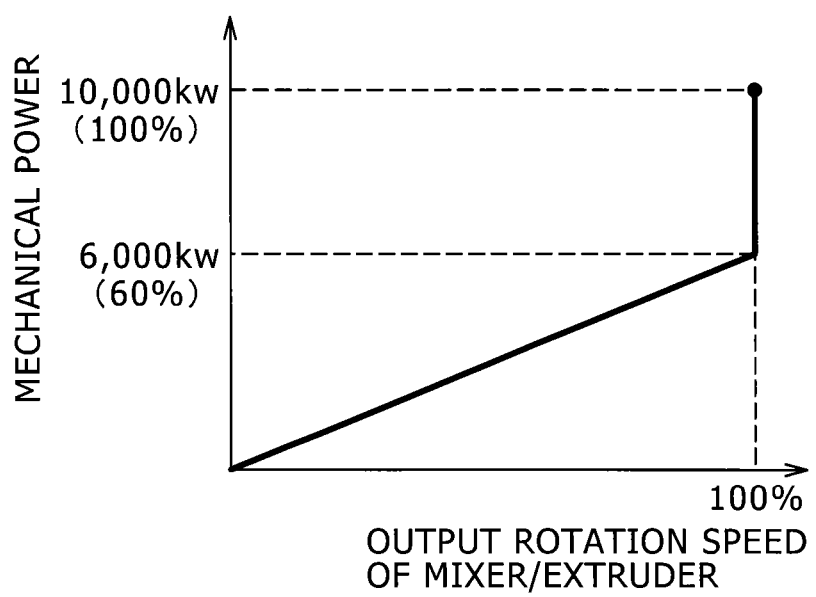
FIG. 2 is a graph showing a situation that rotation speed of an electric motor is controlled in a start-up method for a mixing/extruding apparatus according to the present invention.

As shown in FIG. 2, while the rotation speed of the electric motor 3 is gradually increased within a range of an output ability of the start-up power supply portion 17 (to a maximum output, that is, a maximum capacity of the variable-voltage and variable-frequency power supply device 21), the flow rate of the resin to be charged to the charging portion 7 of the mixer/extruder 2 is increased.

At this time, the speed of the electric motor 3 is increased taking the rotation speed of the electric motor 3 upon the normal operation of the mixing/extruding apparatus 1 as an upper limit. The flow rate of the resin to be charged to the mixer/extruder 2 is increased taking about 40% to 50% of a maximum flow rate upon the normal operation of the mixing/extruding apparatus 1 as an upper limit.

In accordance with an increase in the flow rate of the resin to be charged to the mixer/extruder 2, the load applied to the electric motor 3 is also increased, and eventually, the load exceeding the output (capacity) of the variable-voltage and variable-frequency power supply device 21 in the start-up power supply portion 17 is generated (the consumed power of the electric motor 3 exceeds a rated output of the variable-voltage and variable-frequency power supply device 21).

Thus, upon generation of this load, a switching operation is performed automatically or manually in such a manner that the start-up side switching portion 19a is turned "OFF" and the operation side switching portion 19b is turned "ON" in the power supply switching device 19. Thereby, the power supply state of the drive power to the electric motor 3 is switched from a state that the power is supplied by the start-up power supply portion 17 to a state that the power is supplied by the operation power supply portion 18.

In accordance with a production plan of pellets, the flow rate of the resin to be charged to the mixer/extruder 2 is set within a range of 50% to 100% of the maximum flow rate to be charged, and after this, the mixing/extruding apparatus 1 is in the normal operation. During the normal operation, a resin processing amount is increased. Thus, even when the rotor or the screw of the mixing portion 8 in the mixer/extruder 2 is rotated and driven at maximum rotation speed, a retaining time of the resin in the mixing portion 8 is properly maintained. Therefore, the temperature of the melt resin is not increased over a set temperature. In such a way, after that, a mixing and pelletizing operation is performed at a proper temperature.

Figure 3:
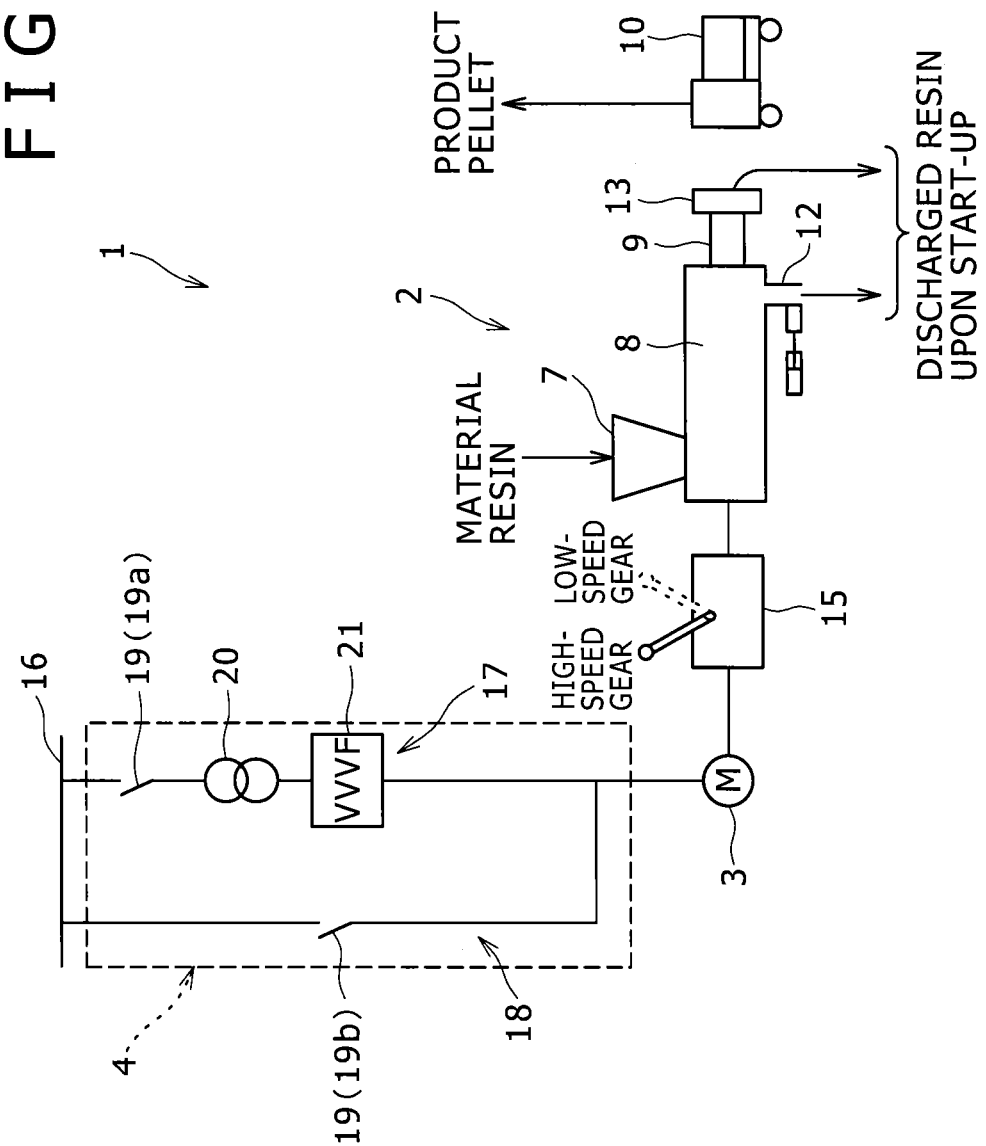
FIG. 3 is a side view schematically showing a second embodiment of the mixing/extruding apparatus according to the present invention.

It should be noted that as shown in FIG. 2, the load applied to the electric motor 3 is permitted until the rated output of the electric motor (mechanical power) becomes 100% (maximum of 10,000 kW in the present embodiment) in accordance with the processing amount, needless to say.

Second Embodiment FIG. 3 shows a second embodiment of the mixing/extruding apparatus 1 according to the present invention.

In this second embodiment, the reducer 15 provided in the coupling part between the electric motor 3 and the mixer/extruder 2 is provided with a two-speed transmission. A start-up method for the mixing/extruding apparatus 1 is basically the same as the first embodiment.

However, in the second embodiment, in a case where the flow rate of the resin to be charged to the mixer/extruder 2 is 50% to 80% of the maximum flow rate to be charged upon the normal operation (in a case where an operation of a low production amount is performed), the reducer 15 is set on the side of a low-speed gear before the start-up, and the rotation speed of the rotor or the screw of the mixing portion 8 in the mixer/extruder 2 is fixed to a low-speed region.

Meanwhile, in a case where the flow rate of the resin to be charged to the mixer/extruder 2 is 80% to 100% of the maximum flow rate to be charged upon the normal operation (in a case where an operation of a high production amount is performed), the reducer 15 is set on the side of a high-speed gear before the start-up, and the rotation speed of the rotor or the screw of the mixing portion 8 in the mixer/extruder 2 is fixed to a high-speed region.

It should be noted that such gear switching of the reducer 15 is favorably performed while the mixer/extruder 2 is stopped.

It should be thought that the embodiments disclosed herein are not limitation but examples in all respects. The scope of the present invention is indicated not by the above description but by the claims, and equal meanings to the claims and all modifications within the scope are intended to be included.

For example, although the maximum output of the start-up power supply portion 17 is 60% of the output of the electric motor 3 in the above description, the maximum output may be 40%. As long as the maximum output is an output matching with the consumed power of the electric motor calculated from the torque required upon the start-up of the mixing/extruding apparatus 1, any value of 60% or less may be adopted.

A case where the power supply switching device 19 is provided with the two portions of the start-up side switching portion 19a and the operation side switching portion 19b is illustrated. However, the start-up side and the operation side may be switched by one switching portion.

A configuration of the mixer/extruder 2 is not at all limited.

What is claimed is:

1. A mixing/extruding apparatus, having:
    a mixer/extruder comprising a charging portion positioned to charge a material to be mixed into the mixer/extruder, a mixing element movable to mix the charged material, a die positioned to extrude the mixed material, and a diverter configured and positioned to divert the mixed material from the die before the mixed material reaches the die;
    an electric motor for driving the mixing element of said mixer/extruder; and
    a power supply device for supplying a drive power to said electric motor, wherein
    said power supply device includes:
    a start-up power supply portion for supplying a variable drive power while the diverter is open, with which said electric motor is rotated at low speed with a smaller output than an output generated upon a normal operation to said electric motor;
    an operation power supply portion provided in parallel with said start-up power supply portion for supplying a constant drive power with which said electric motor is rotated at high speed with the output generated upon the normal operation to said electric motor; and
    a power supply switching device for switching the drive power from the start-up power supply portion to be supplied to said electric motor to the drive power from the operation power supply portion.

2. The mixing/extruding apparatus according to claim 1, wherein
    said start-up power supply portion is a power supply for supplying a drive power with which a maximum output of said electric motor becomes 60% or less of a rated output to said electric motor.

3. The mixing/extruding apparatus according to claim 2, wherein
    the power supply includes a transformer, and a variable-voltage and variable-frequency power supply device.

* * * * *